(No Model.) 3 Sheets—Sheet 3.
F. RITTENHOUSE.
BRAKE FOR VEHICLES.
No. 589,755. Patented Sept. 7, 1897.
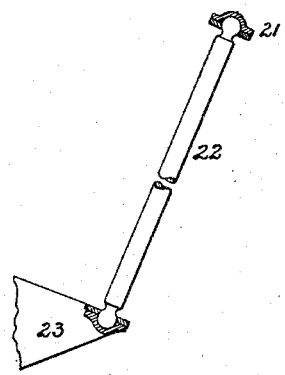
FIG. 10.
FIG. 11.
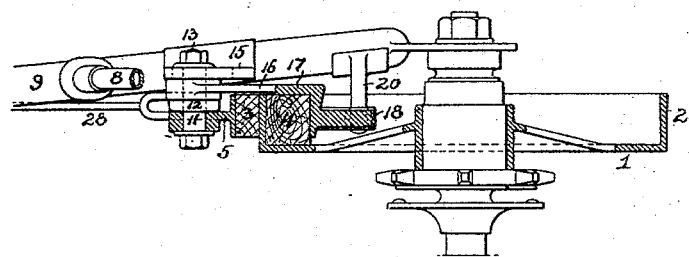
FIG. 12.
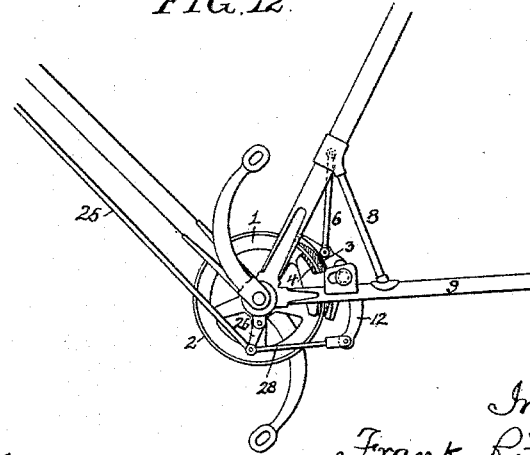
Witnesses
Hamilton D. Turner
Charles DeLeon
Inventor
Frank Rittenhouse
by his attorneys
Howson & Howson

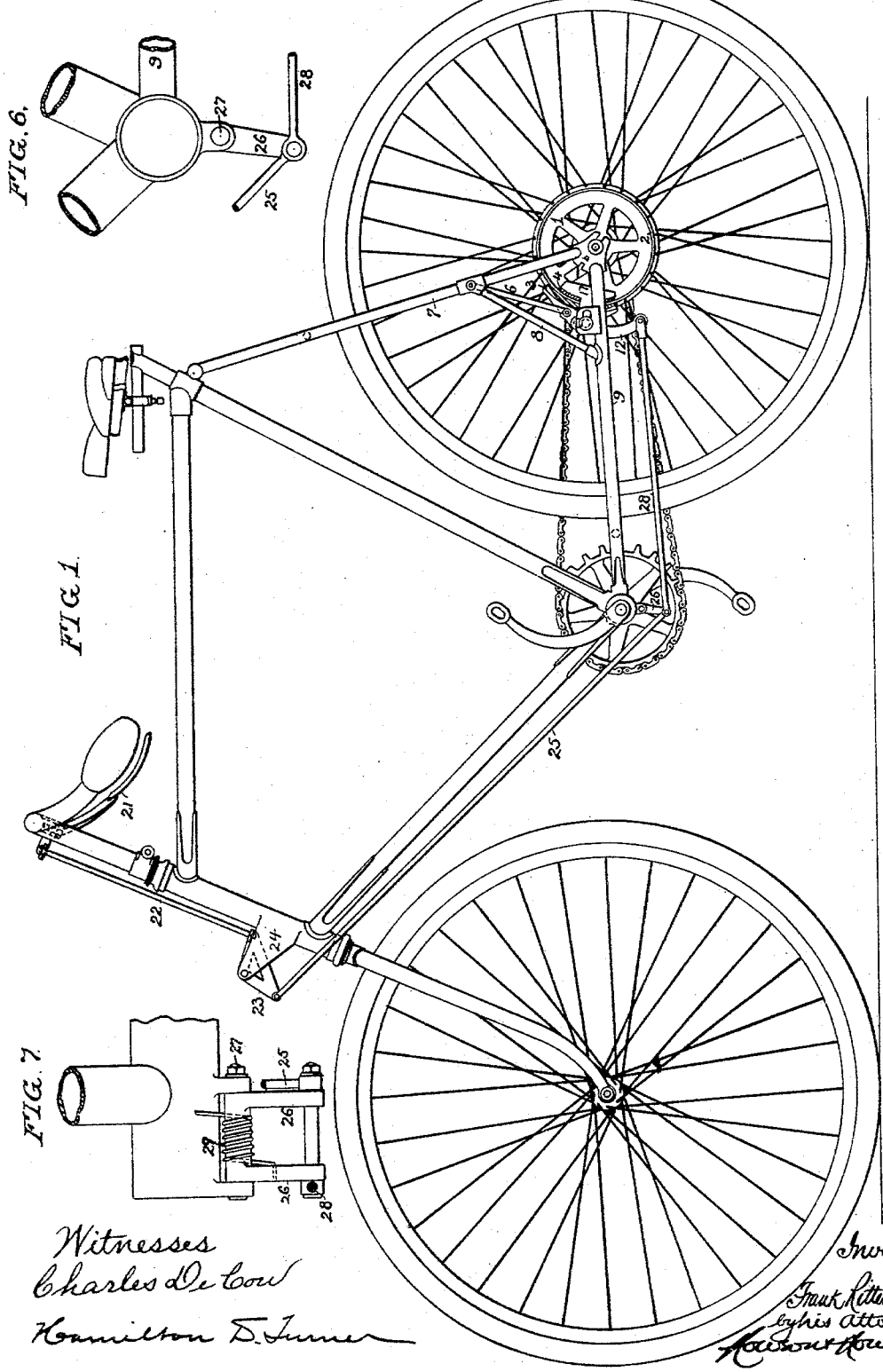

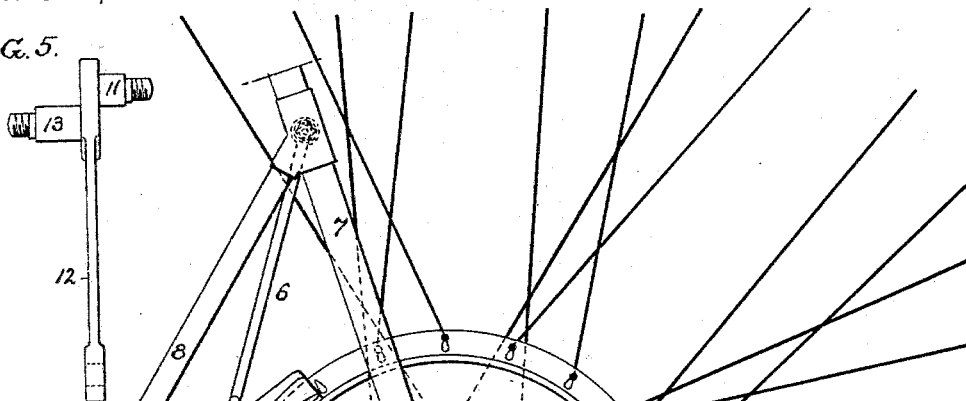

UNITED STATES PATENT OFFICE.

FRANK RITTENHOUSE, OF NORRISTOWN, PENNSYLVANIA.

BRAKE FOR VEHICLES.

SPECIFICATION forming part of Letters Patent No. 589,755, dated September 7, 1897.

Application filed October 27, 1896. Serial No. 610,211. (No model.)

*To all whom it may concern:*

Be it known that I, FRANK RITTENHOUSE, a citizen of the United States, and a resident of Norristown, Montgomery county, Pennsylvania, have invented certain Improvements in Brakes for Vehicles, of which the following is a specification.

The object of my invention is to provide a powerful and effective brake for cycles or other vehicles, an object which I attain in the manner hereinafter set forth, reference being had to the accompanying drawings, in which—

Figure 1 is a side view of a bicycle provided with a brake in accordance with my invention. Fig. 2 is a side view, on a larger scale, of part of the device. Fig. 3 is a view, partly in top or plan and partly in sectional plan, of those parts of the brake which are shown in Fig. 2. Fig. 4 is a rear view of part of the braking mechanism. Fig. 5 is a view of the lever which operates the brake-shoes. Figs. 6, 7, 8, 9, and 10 are views illustrating special features of construction of parts of the brake, and Figs. 11 and 12 are views illustrating modifications of the invention.

The bicycle shown in Fig. 1 may be similar to those of ordinary construction, except that it has surrounding the hub, at one side of the driving-wheel, a web, 1 with projecting annular flange 2, on which are adapted to act inner and outer brake-shoes, the outer brake-shoe having in the present instance a friction block or facing 3 of wood or other available material, and the inner brake-shoe having a similar block 4. As shown, the flange is on that side of the wheel opposite to the driving-sprocket, but it may be on the same side as the sprocket or may form part of the latter, if desired. (See Fig. 11.)

The outer brake-shoe has a web 5, which is hung by means of a link, rod, or bar 6 from one of the rear forks 7 of the framework of the bicycle, this fork 7 being preferably connected by an angular brace-rod 8 with the corresponding lower fork 9 of the bicycle-frame, and the two forks 7 and 9 uniting in the usual plate 10, to which one end of the rear axle is secured.

The use of the angular brace-rod 8 is to stiffen the rear form 7, in order to prevent the pull upon the link 6, when the brake is applied, from too severely straining said rear fork.

The web 5 of the outer brake-shoe engages with a pin 11, projecting from one side of a lever 12, and from the opposite side of said lever some distance farther inward from the upper end of the same than the pin 11 projects a pin 13, which is free to slide in an elongated slot 14, formed in a bracket 15, suitably secured to the lower fork 9, said slot 14 being preferably inclined upward slightly from the rear to the front end.

Engaging with the pin 13 between the lever 12 and bracket 15 is an arm 16, which projects forwardly from a box or casing 17, constituting the inner brake-shoe, said box or casing having a rearwardly-projecting lug 18, which is supported upon the upper end of a set-screw 19, adapted to a threaded opening in a bracket 20, secured to and projecting inwardly from the lower fork 9 of the frame. When, therefore, the lower end of the lever 12 is drawn forward in the direction of the arrow, Fig. 2, it will have the effect of drawing the inner brake-shoe forwardly and thrusting the outer brake-shoe rearwardly. Hence the annular flange 2 will be firmly gripped between the blocks 3 and 4 of the two shoes and an effective braking of the driving-wheel will result.

Movement of the lever 12 in a direction opposite to that pointed out by the arrow in Fig. 2 will effect the withdrawal of the brake-shoes, so as to free their blocks 3 and 4 from contact with the inner and outer faces of the annular flange 2.

The brake-shoes are supported, respectively, by the link 6 and set-screw 19, which not only retain said parts in their proper vertical position, but resist the pull or thrust upon them when they are gripping the flange 2. The link 6 and set-screw 19 are located at the lateral center of gravity of the respective brake-shoes, so as to counteract any tendency to twisting or lateral distortion of said shoes, the bracket 15 not being intended to resist any of the strain upon the brake-shoes, but simply to prevent lateral withdrawal or movement of the same.

The lever 12 may be operated by the hand or foot through the medium of transmitting devices of any appropriate character, these devices varying in accordance with the character of the vehicle to which the brake is applied.

In the case of a bicycle such as shown in the drawings I prefer to use a hand-lever 21, hung to the handle-bar of the bicycle and connected by a compression or thrust rod 22 to one arm of a bell-crank lever 23, hung to a bracket 24, projecting forwardly from the front bar of the bicycle-frame, the rod 22 having by preference ball-and-socket or other universal connections with the levers 21 and 23, as shown in Fig. 10, so as to permit of any desired variation in its angular relation to these two levers. The depending arm of the lever 23 is connected by a tension or pull rod 25 to one arm of a duplex link 26, which is hung to a pin 27, carried by lugs depending from the crank-hanger of the machine, the other arm of said duplex link being connected by a tension or pull rod 28 to the lever 12. Coiled around the sleeve which connects the two arms of the link 26 and receives the pivot-bolt 27 is a spring 29, one extremity of which bears against the crank-hanger, while its other extremity engages one of the arms of the said link 26, the tendency of this spring being to constantly thrust the link, and consequently the lever 12, rearward, so as to remove the blocks 3 and 4 of the brake-shoes from contact with the brake-flange of the driving-wheel, upward pressure upon the lever 21 serving to draw said lever 12 forward in order to clamp the flange 2 and apply the brake.

The lower end of the link 6 is forked, as shown in Fig. 8, and the top of said fork bears such relation to the outer brake-shoe that when the brakes are released contact of the upper part of said shoe with the top of the fork will prevent the lower portion of the block 3 from swinging into contact with the outer face of the flange 2. Said flange 2 is slightly tapered on the inner face, being thickest at the outer edge, (shown in Fig. 9,) so that when the brake-shoes are applied there will be a tendency to draw the inner shoe inward rather than the reverse.

Although I have shown and prefer to use the annular flange 2 in connection with the driving-wheel, it will be manifest that so far as the main idea of my invention is concerned said flange and the braking devices acting upon it may be employed in connection with the crank-shaft, as shown in Fig. 12, or with any other available wheel or shaft of the driving-gear where such additional wheel or shaft is used.

Having thus described my invention, I claim and desire to secure by Letters Patent—

1. The combination of the wheel having a laterally-projecting annular flange, the inner and outer brake-shoes, a lever carried by the frame of the wheel having projecting pins in different planes, one of said pins engaging with the outer brake-shoe and the other engaging with the inner brake-shoe, and provision for moving said lever, substantially as specified.

2. The combination of the wheel having a laterally-projecting annular flange, inner and outer brake-shoes, a lever having pins in different planes, one engaging one shoe and the other engaging the other shoe, and means for moving the lever and for supporting said brake-shoes independently of said lever, substantially as specified.

3. The combination of the wheel having an annular flange projecting laterally therefrom, the inner and outer brake-shoes, a lever having a pin engaging with the outer brake-shoe, and another pin in a different plane engaging with the inner brake-shoe, means for moving the lever and for supporting said shoes, and a bracket or stop-plate for restricting lateral movement of the same, substantially as specified.

4. The combination of the wheel having an annular flange projecting therefrom, the inner and outer brake-shoes, a depending link to which the outer brake-shoe is hung, and lever mechanism whereby the brake-shoes are moved toward and from the inner and outer faces of the annular flange, substantially as specified.

5. The combination of the wheel having an annular flange projecting therefrom, inner and outer brake-shoes, a lug projecting from said inner brake-shoe, a set-screw providing a support for said lug, and lever mechanism whereby the brake-shoes are moved toward and from the inner and outer faces of the annular flange, substantially as specified.

6. The combination of the lower and rear forks of the frame, the angular brace-rod connecting said lower and rear forks, the wheel having an annular flange projecting therefrom, inner and outer brake-shoes, a hanger whereby the outer brake-shoe is suspended from the rear fork, and lever mechanism for operating said brake-shoes, substantially as specified.

7. The combination of the wheel having an annular flange projecting therefrom, inner and outer brake-shoes, lever mechanism for operating the same, and a swinging hanger for the outer brake-shoe having a portion serving by contact with said shoe to limit the pivotal movement of the latter on the hanger, substantially as specified.

8. The combination of the wheel having an annular flange beveled on the inner side so as to be thickest at the outer edge, inner and outer brake-shoes, and lever mechanism for operating the latter, substantially as specified.

9. The combination in a bicycle, of the driving-wheel having an annular flange projecting therefrom, brake-shoes for engaging said flange, a lever for operating said brake-shoes, a lever adjacent to the handle-bar of the machine, and means for transmitting the movement of said handle-bar lever to the brake-lever, one of the elements of said transmitting mechanism being a duplex link hung to bearings on the crank-hanger, and acted upon by a spring tending to move it so as to release the brakes, substantially as specified.

10. The combination in a brake for bicycles, of the driving-wheel having an annular flange projecting therefrom, inner and outer brake-shoes for engaging said flange, a lever for operating said brake-shoes, a lever adjacent to the handle-bar of the machine, a bell-crank lever hung to bearings on the head of the machine, a link hung to bearings on the crank-hanger, a compression-rod connecting the handle-bar lever and the lever on the front head, and tension-rods connecting said lever on the front head to the link on the crank-hanger, and connecting the latter to the brake-lever, substantially as specified.

In testimony whereof I have signed my name to this specification in the presence of two subscribing witnesses.

FRANK RITTENHOUSE.

Witnesses:
F. E. BECHTOLD,
JOS. H. KLEIN.